United States Patent [19]

Ozawa et al.

[11] Patent Number: 4,926,212

[45] Date of Patent: May 15, 1990

[54] DRIVING APPARATUS FOR OPTICAL DEVICE OF PHOTOGRAPHIC PRINTER

[75] Inventors: Yoshio Ozawa; Takashi Yamamoto, both of Kanagawa, Japan

[73] Assignee: Fuji Photo Film Co., Ltd., Kanagawa, Japan

[21] Appl. No.: 313,575

[22] Filed: Feb. 22, 1989

[30] Foreign Application Priority Data

Feb. 22, 1988 [JP] Japan .................................. 63-38939

[51] Int. Cl.[5] ...................... G03B 27/52; G03B 27/70; G03B 27/74; G03B 27/80
[52] U.S. Cl. ........................................ 355/43; 355/45; 355/68
[58] Field of Search ........................ 355/45, 51, 57, 60, 355/65, 66, 68, 43

[56] References Cited

U.S. PATENT DOCUMENTS

| | | | |
|---|---|---|---|
| 3,094,036 | 6/1963 | Benson | 355/45 X |
| 3,480,360 | 11/1969 | Mallory et al. | 355/43 X |
| 3,623,807 | 11/1971 | Gabler et al. | 355/68 X |
| 4,367,033 | 1/1983 | Watanabe | 355/45 X |
| 4,557,591 | 12/1985 | Serizawa et al. | 355/45 X |
| 4,589,767 | 5/1986 | Yanagi et al. | 355/45 |
| 4,592,649 | 6/1986 | Freitag et al. | 355/43 |
| 4,786,949 | 11/1988 | Yamamoto | 355/68 |

Primary Examiner—Richard A. Wintercorn
Attorney, Agent, or Firm—Sughrue, Mion, Zinn, Macpeak & Seas

[57] ABSTRACT

A driving device for causing said optical device disposed in a photographic printer to move between the off-optical-axis position and the on-optical-axis position of the optical device. The optical device is driven by combination of a driving wheel, a driven wheel, and a flexible elongated member passed around the driving wheel and the driven wheel. A tension member is inserted between both ends of the elongated member in a looped state thereof. After the optical device has been driven by a predetermined distance, the driving wheel is further driven by a slight amount even after the first stopper of the optical device has come into contact with the second stopper to thereby loosen the portion of the elongated member defined between the driving wheel and the first stopper as well as to expand the tension member. Thereafter, when a predetermined strength of tension is applied, the portion of the elongated member which is wound around the driving wheel slips upon the driving wheel and thus the looseness of the elongated member is cancelled by the tensile force of the tension member. Accordingly, the optical device surely comes to a halt at a predetermined on-optical-axis position.

19 Claims, 3 Drawing Sheets

DRIVING APPARATUS FOR OPTICAL DEVICE OF PHOTOGRAPHIC PRINTER

BACKGROUND OF THE INVENTION

1. Field of the Invention

The present invention relates to a driving apparatus for an optical device in a photographic printer and, more particularly, to a driving apparatus which is arranged to guide and drive such an optical device between an on-optical-axis position and an off-optical-axis position.

2. Description of the Related Art

A photographic printer for printing an image on photographic paper is arranged to print an image from a negative film onto the photographic paper by means of optical means such as a lens.

Prior to printing of an image from the negative film, there is a case where the amount of exposure is determined by focusing the image on an imaging device such as a CCD and measuring the density of the negative film. In this operation, a reflection mirror is inserted into the optical axis to reflect image light toward the CCD.

Accordingly, in order to carry out efficient printing operation, it is indispensable to accurately and rapidly insert the reflection mirror into the optical axis. If a clutch or a brake is used in a drive system for driving the reflection mirror, rapid and accurate positioning is enabled. However, the structure becomes complicated and inexpensive.

SUMMARY OF THE INVENTION

It is, therefore, an object of the present invention to provide a driving apparatus for an optical device of a photographic printer, which apparatus is capable of moving the optical device to an on-optical-axis position rapidly, surely and by means of a simple structure.

To achieve the above object, in accordance with the present invention, there is provided a driving apparatus which comprises a guide device for guiding an optical device between an off-optical-axis position and an on-optical-axis position, a driving mechanism including a flexible elongated member looped around a driving wheel and a driven wheel, the flexible elongated member having intermediate portions disposed in parallel to each other, the portion of the elongated member which is wound around the driving wheel being capable of slipping with respect to the driving wheel under a predetermined tension, a connecting means for connecting one of the parallel intermediate portions to the optical device, a tension resilient member disposed in the other parallel intermediate portion by insertion, a stopper arranged to come into contact with the optical device to cause the optical device to stop at the on-optical-axis position, and a driving device arranged to drive the driving wheel to cause the optical device to move toward the on-optical-axis position and to continue to drive the driving wheel by a slight amount even after the optical device has come into contact with the stopper, thereby expanding the tension resilient member.

In accordance with the present invention, if the driving device is activated when the optical device such as a reflection mirror is located at the off-optical-axis position, then the driving wheel is rotated and the elongated member causes the optical device to move toward the optical axis. When the optical device reaches the on-optical-axis position, the stopper comes into contact with the optical device to stop the movement of the optical device. Thereafter, since the driving device continues to drive the driving wheel by a slight amount, one of the parallel intermediate portions of the elongated member becomes loose by a slight amount, while the tension resilient member inserted in the other parallel intermediate portion is expanded. In this manner, the stopper surely causes the optical device to stop at the on-optical-axis position. When the rotation of the driving wheel is stopped, the tension resilient member shrinks to its original length. In this case, the elongated member located between the tension resilient member and the stopper is restored to its original state by the tension of the tension resilient member.

Since the stopper is provided with an attracting means, the optical device is attracted at the on-optical-axis position and thus stops at that position accurately.

The above and other objects, features and advantages of the present invention will become apparent from the following description of the preferred embodiment thereof, taken in conjunction with the accompanying drawings.

DESCRIPTION OF THE PREFERRED EMBODIMENT

A preferred embodiment of the present invention will be described below with reference to the accompanying drawings.

Figure 2:
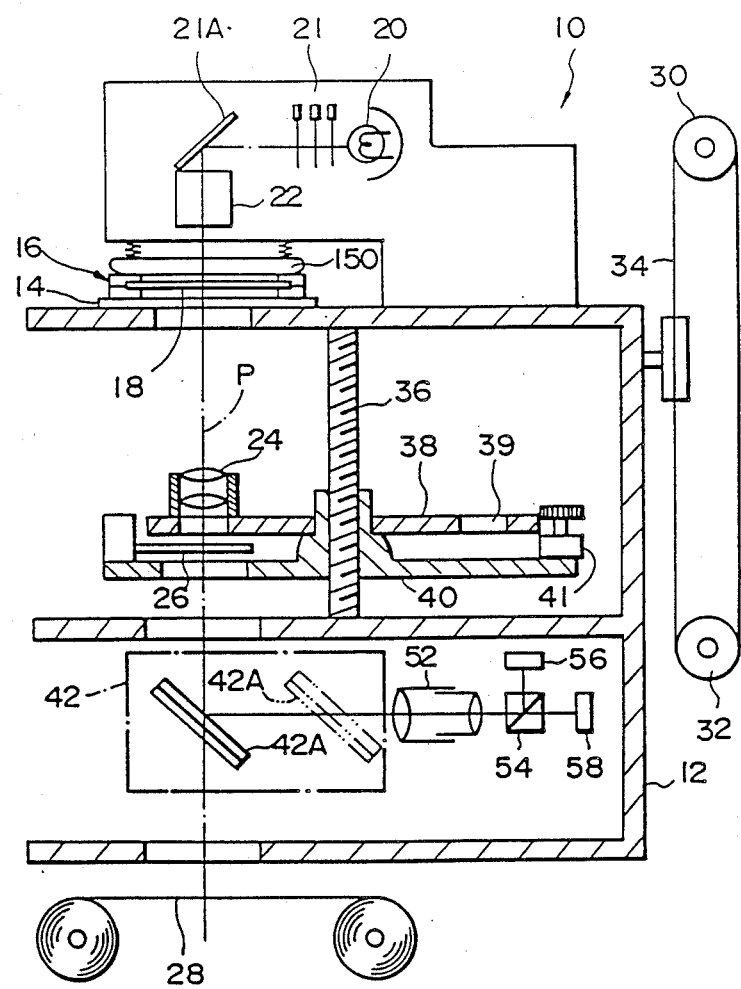
FIG. 2 is a cross-sectional view diagrammatically showing a photographic printer to which the present invention is applied.

FIG. 2 shows a vertical arrangement type of photographic printer 10 to which an embodiment of the present invention is applied. A housing 12 has a base plate 14 for carrying a negative film carrier 16, and a negative film 18 can be loaded into the negative film carrier 16.

In the housing 12, a light source 20, a YMC filter 21, a mirror 21A, and a light diffusing cylinder 22 are disposed coaxially to the negative film carrier 16, and printing light is transmitted to photographic paper 28 through a printing lens 24 and a shutter 26. The housing 12 is secured to a portion of a belt 34 passed around pulleys 30 and 32 and is capable of moving upwardly and downwardly as viewed in FIG. 1 by means of the pulleys 30 and 32 which are driven by the driving force of a motor (not shown).

The printing lens 24 is attached to a turret 38 which is carried by a lifting table 40 supported on the housing 12 for movement along the axis of a screw shaft 36. The turret 38 can be rotated by the driving of a motor 41, which is attached to the lifting table 40, so as to locate another printing lens on the optical axis. Rotation of the lifting table 40 is normally inhibited and, as the screw shaft 36 is rotated by the driving force of the motor 43, the lifting table 40 together with the turret 38 moves up and down to alter the conjugate length of the printing lens 24.

A reflection-mirror driving device 42 is disposed in the housing 12 for causing a mirror 42A to slide in the horizontal direction so that the mirror 42A can move into and out of the optical axis.

The mirror 42A reflects printing light emitted from the light source 20 and transmits the printing light to two image sensors 56 and 58 through a zoom lens 52 and a beam splitter 54. Negative images of size corresponding to the size of the negative film 18 are focused on the image sensors 56 and 58 by the zoom lens 52, respectively, and the density of each selected point of these negative images is measured by scanning.

Figure 1:
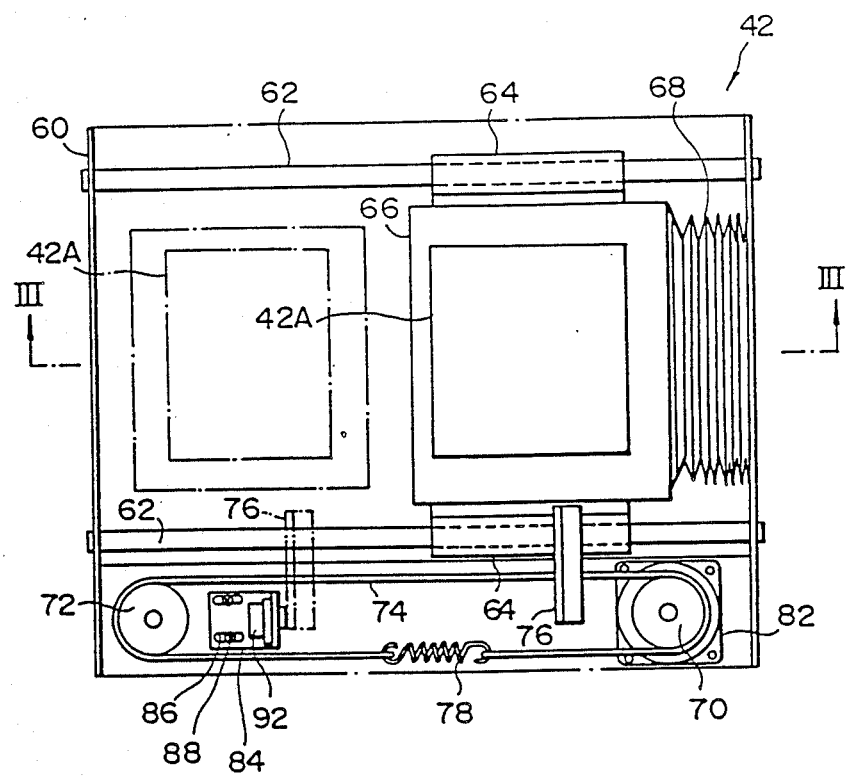
FIG. 1 is a plan view diagrammatically showing a reflection-mirror driving apparatus to which one embodiment of the present invention is applied.
Figure 3:
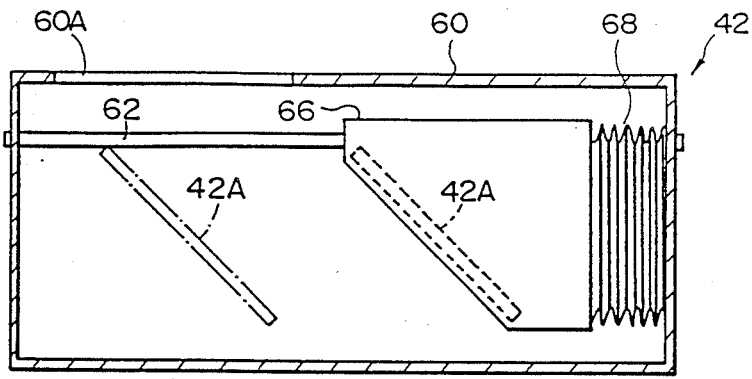
FIG. 3 is a cross section taken along line III—III of FIG. 1.

As shown in FIGS. 1 and 3, the reflection-mirror driving apparatus 42 has a housing 60 of an approximately rectangular shape, and a pair of guide bars 62 extend across the housing 60 in the horizontal direction. A mirror case 66 is carried on the guide bars 62 by means of slide bearings 64. Accordingly, the mirror case 66 is capable of sliding along the guide bars 62 in the horizontal direction so that it can move between the off-optical-axis position shown by solid lines in FIGS. 1 and 3 and the on-optical-axis position shown by phantom lines (or dot-dashed lines) in the figures.

The housing 60 has an aperture 60A for transmitting printing light to the mirror 42A which is located at the on-optical-axis position. A bellows 68 is disposed between the mirror case 66 and the housing 60 so as to guide reflected printing light into the zoom lens 52 of FIG. 2.

As shown in FIG. 1 by way of example, the housing 60 further includes a driving wheel 70, a driven wheel 72, and a wire 74 which is passed around the wheels 70 and 72. Intermediate portions of the wire 74 are maintained in parallel with each other in the area between the driving wheel 70 and the driven wheel 72, and the parallel intermediate portion which is closer to the mirror case 66 is connected to a bracket 76 mounted on the mirror case 66. The other parallel intermediate portion includes both ends of the wire 74, and a tension coil spring 78 is inserted between the ends of the wire 74 in the looped state thereof so as to always apply tension to the wire 74.

The driving wheel 70 is arranged to rotate back and forth by the driving force of a motor 82 which is secured to the housing 60, thus causing the mirror case 66 to move back and forth between the off-optical-axis position and the on-optical-axis position of the mirror 42A. At the on-optical-axis position, the movement of the bracket 76 is inhibited by a stopper 84 which is secured to the housing 60.

Figure 4:
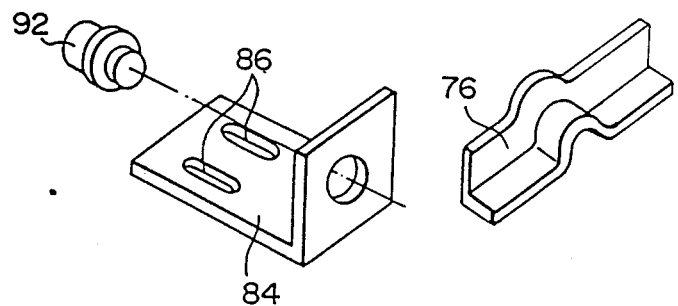
FIG. 4 is an exploded perspective view of a stopper used in the embodiment.

As shown in FIG. 4, the stopper 84 is made of a metal sheet which is L-shaped in cross section. Stopper screws 88 are, as shown in FIG. 1, screwed into the housing 60 through the respective slots 86 to secure the stopper 84 to the housing 60 with the position of the stopper 84 being adjustable. An electromagnet 92 which is a kind of attracting means is secured to the upright portion of the stopper 84. Thus, when the mirror 42A reaches the on-optical-axis position, the electromagnet 92 attracts the bracket 76 to stop the mirror 42A as shown by the phantom lines (or dot-dashed lines) in FIG. 1.

The following is a description of the operation of the embodiment of the present invention.

For printing work, the negative film 18 is loaded into the negative carrier 16 and located on the optical axis. When a light measuring button (not shown) is pressed, the motor 82 is activated to move the mirror 42A onto the optical axis. More specifically, the motor 82 shown in FIG. 1 is driven in the counterclockwise direction to apply tension to the wire 74, thereby causing the mirror case 66 to move leftwardly. The strength of tension and the kind of material of the wire 74 are selected so that the wire 74 in the above-described state may not slip on the driving wheel 70 or the driven wheel 72.

When the mirror 42A reaches the optical axis, the bracket 76 comes into contact with the electromagnet 92 of the stopper 84 to stop the movement of the mirror 42A. In this case, since the bracket 76 is attracted by the magnetic force generated in the electromagnet 92 which is energized in advance, the stop position of the mirror 42A is accurately controlled.

The motor 82 causes the driving wheel 70 to rotate by a slight amount in the counterclockwise direction in FIG. 1. Thus, the tension coil spring 78 is expanded by a slight amount to loosen the portion of the wire 74 which is defined between the driving wheel 70 and the bracket 76. When the motor 82 is stopped in this state, the tension coil spring 78 pulls the straight portion of the wire 74 between the driving wheel 70 and the tension coil spring 78. Thus, the portion of the wire 74 between the driving wheel 70 and the bracket 76 is pulled to cause a slip between the wire 74 and the driving wheel 70 which is not rotating. When the tension coil spring 78 is restored to its original state, the tension before driving is again applied to the wire 74, thereby causing it to stop.

When the mirror 42A is accurately located on the optical axis in this fashion, printing light emitted from the light source 20 is diffused in the light diffusing cylinder 22 to illuminate the negative film 18. The light transmitted through the negative film 18 passes through an opening in the turret 38 and is then reflected in the lateral direction by the mirror 42A. The reflected light passed through the zoom lens 52 is divided into two parts by the beam splitter 54 and the two parts are made incident upon the image sensors 56 and 58, respectively. Then, negative images of size corresponding to the size of the negative film 18 are respectively focused on the image sensors 56 and 58 by the zoom lens 52, and the density of each selected point of these negative images is measured by scanning.

The density of each selected point of the negative images is measured through the image sensors 56 and 58, and the amount of exposure for printing is calculated on the basis of the density values thus obtained.

In printing, the turret 38 is rotated by the driving of the motor 41 and thus the printing lens 24 corresponding to the desired printing size is located on the optical axis. Simultaneously, the motor 82 is reversed to cause the mirror 42A to move back to the off-optical-axis position shown in FIGS. 1 and 3. Then, since the wire 74 is separated from from the stopper 84, no slip occurs between the wire 74 and the driving wheel 70 as well as the driven wheel 72, whereby the mirror 42A can rapidly move out of the optical axis. In this state, the shutter 26 opens for a time period corresponding to the amount of exposure for printing, and an image is printed from the negative film 18 onto the photographic paper 28.

Although, in the above-described embodiment, the electromagnet 92 is used as a means for attracting the bracket 76, another attracting means such as a negative-pressure device may be employed.

As described above, in accordance with the present invention, there is provided a driving apparatus which comprises a guide device for guiding an optical device between an off-optical-axis position and an on-optical-axis position, a driving mechanism including a flexible elongated member looped around a driving wheel and a driven wheel, the flexible elongated member having intermediate portions disposed in parallel to each other, the portion of the elongated member which is wound around the driving wheel being capable of slipping with respect to the driving wheel under a predetermined tension, a connecting means for connecting one of the parallel intermediate portions to the optical device, a tension resilient member disposed in the other parallel intermediate portion by insertion, a stopper arranged to come into contact with the optical device to cause the optical device to stop at the on-optical-axis position, and a driving device arranged to drive the driving wheel to cause the optical device to move toward the on-optical-axis position and to continue to drive the driving wheel by a slight amount even after the optical device has come into contact with the stopper, thereby expanding the tension resilient member. Accordingly, the present invention can provide an excellent effect of rapidly and positively locating the optical device such as a reflection mirror onto the optical axis.

What is claimed is:

1. A driving apparatus for an optical device of a photographic printer, comprising:
   an optical device movably disposed in said photographic printer;
   means for driving said optical device between an off-optical-axis position and an on-optical-axis position of said optical device;
   means for stopping the motion of said driving means so as to surely stop said optical device at said on-optical-axis position after said optical device has been driven by a predetermined distance; and
   means for controlling said driving means to cause said optical device to come to a halt after said optical device has stopped.

2. A driving apparatus according to claim 1, further comprising means for guiding said optical device between said off-optical-axis position and said on-optical-axis position.

3. A driving apparatus according to claim 1, wherein said driving means includes a drive source, a driving wheel driven by said drive source, a driven wheel, and a flexible elongated member passed around said driving wheel and said driven wheel.

4. A driving apparatus according to claim 3, wherein the portion of said elongated member which is wound around said driving wheel can be slipped on said driving wheel when a predetermined tension is applied.

5. A driving apparatus according to claim 4, wherein said elongated member has tension means which connects both ends of said elongated member so as to apply tension to said elongated member.

6. A driving apparatus according to claim 5, wherein said stopper means includes a first stopper provided on said optical device and a second stopper provided at said on-optical-axis position, said stopper means being arranged to stop said optical device at said on-optical-axis position by bringing said first stopper into contact with said second stopper.

7. A driving apparatus according to claim 6, further comprising means for connecting a pair of said elongated member to said optical device.

8. A driving apparatus according to claim 3, wherein said driving means drives said driving wheel to cause said optical device to move onto said on-optical-axis position along said guiding means.

9. A driving apparatus according to claim 6, wherein said controlling means is a mechanism which is arranged to drive said driving wheel by a slight amount even after said first stopper of said optical device has come into contact with said second stopper, and to subsequently loosen the portion of said elongated member defined between said driving wheel and said first stopper as well as to expand said tension means, and then to cancel the looseness of said elongated member by the tensile force of said tension means.

10. A driving apparatus according to claim 6, wherein at least one of said first and second stoppers is provided with magnetic attracting means.

11. A driving apparatus according to claim 2, wherein said optical device is provided with a mirror and a supporting member of said mirror.

12. A driving apparatus according to claim 11, wherein said guiding means is constituted by a combination of guide bars and bearings each of which is disposed between a corresponding one of said guide bars and said supporting member.

13. A driving apparatus according to claim 7, wherein said connecting means is constituted by said first stopper.

14. A driving apparatus for an optical device of a photographic printer, comprising:
   an optical device movably disposed in said photographic printer;
   a driving device for moving said optical device between an off-optical-axis position and an on-optical-axis position of said optical device, said driving device including a drive source for driving said driving device, a driving wheel driven by said drive source, and a driven wheel;
   a flexible elongated member passed around said driving wheel and said driven wheel, said elongated member having a tension member which is inserted between both ends of said elongated member in a looped state thereof to connect said both ends to each other, the portion of said elongated member which is wound around said driving wheel being capable of slipping with respect to said driving wheel under a predetermined tension;
   connecting means for connecting a portion of said elongated member to said optical device;
   a first stopper provided on said optical device;
   a second stopper provided on said optical axis, said first stopper being arranged to come into contact with said second stopper to stop said optical device at said on-optical-axis position; and
   a control device for controlling said driving device to cause said optical device to come to a halt after said optical device has stopped, said control device being arranged to drive said driving wheel by a slight amount even after said first stopper of said optical device has come into contact with said second stopper, and to subsequently loosen the portion of said elongated member defined between said driving wheel and said first stopper as well as to expand said tension member, and then to cancel the looseness of said elongated member by the tensile force of said tension member.

15. A driving apparatus according to claim 14, further comprising a guide device of said optical device between said off-optical-axis position and said on-optical-axis position.

16. A driving apparatus according to claim 14, wherein at least one of said first and second stoppers is provided with magnetic attracting means.

17. A driving apparatus according to claim 15, wherein said optical device is provided with a mirror and a supporting member of said mirror.

18. A driving apparatus according to claim 17, wherein said guide device is constituted by a combination of guide bars and bearings each of which is deposited between a corresponding one of said guide bars and said supporting member.

19. A driving apparatus according to claim 14, wherein said connecting means is constituted by said first stopper.

* * * * *